3,016,383
CERTAIN 4-PHENYLBENZOYL METHYL-1,2-
DIARYL PYRAZOLIDINE-DIONES
Gerald D. Laubach, Niantic, and Ellis R. Pinson, Jr.,
Waterford, Conn., assignors to Chas. Pfizer & Co.,
Inc., New York, N.Y., a corporation of Delaware
No Drawing. Filed Nov. 4, 1959, Ser. No. 850,790
6 Claims. (Cl. 260—310)

This application is concerned with new and useful derivatives of pyrazolidine-3,5-dione corresponding to the following formula:

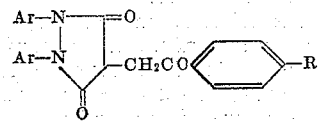

or its tautomeric forms as well as the salts with inorganic or organic bases.

In the above formula, Ar may be phenyl or substituted phenyl in which the substituent is chlorine, hydroxy lower alkanoyloxy, benzyloxy, or alkyl or alkoxy containing from 1 to 3 carbon atoms, and R may be phenyl or substituted phenyl in which the substituent is hydroxy, chloro, bromo, iodo or alkyl or alkoxy of from 1 to 3 carbon atoms.

Of course, the specified carbon content of the above described substituents represents the preferred and is not meant to exclude related groups of higher carbon content. The present new compounds may contain a variety of other substituents but those containing the above described substituents are preferred since they are prepared from readily available intermediates. The pyrazolidine-3,5-dione derivatives of the present invention which may be defined generally as 1,2-diaryl-4-acylmethylpyrazolidine-3,5-diones may be prepared by the reaction of a corresponding 1,2-diarylpyrazolidine-3,5-dione or a salt thereof with a 4-phenylphenacyl halide or 4-(substituted phenyl)phenacyl halide in which the substituent is hydroxy, chloro, bromo, iodo and alkyl and alkoxy of from 1 to 3 carbon atoms. The reaction is preferably carried out by heating an alkali metal salt of 1,2-diarylpyrazolidine-3,5-dione with the selected 4-phenylphenacyl halide in a suitable solvent. Particularly suitable solvents are aqueous lower alkanols, for example, methanol, ethanol, propanol, etc. This mixture is usually refluxed for about 1 hour and then cooled. The crystalline product which begins to separate at the inception of heating is then obtained by standard procedures, for example, filtration of the reaction mixture, and may be purified by recrystallization from solvents such as acetone or lower alkanols. An equal molar ratio of the reactants may be employed but it is generally preferred to employ slight excesses of the 4-phenyl phenacyl halide for example, excesses up to about 10%.

The compounds of the present invention possess useful and valuable analgesic, antipyretic and/or anti-inflammatory properties. Although generally pyrazolidine diones have been known as therapeutics with analgesic and antipyretic action, their use is considerably limited since they are found to have appreciable toxic effects. The compounds of the present invention, however, have appreciably reduced toxicity in comparison with already known pyrazolidine dione derivatives and consequently are more desirable for use in human therapy.

The pyrazolidine-3,5-dione derivatives of the present invention form salts with basic compounds. This property of salt formation is particularly advantageous, for example, alkali metal salts which are water soluble may be employed in the preparation of injectable solutions of the therapeutic agents of this invention. The basic salts of the compounds of the present invention may be prepared by standard procedures. For example, the 1,2-diaryl-4-acylmethyl-pyrazolodine-3,5-dione may be dissolved in a solution of the base in equivalent amounts and the resultant solution concentrated to obtain the desired metal salts. Suitable inorganic bases are metal hydroxides or carbonates, such as sodium hydroxide, potassium carbonate, and so forth. Alternatively, salts of organic bases may be prepared by treating the selected pyrazolidine-3,5-diones with the organic bases preferably in a solvent such as a lower alkanol and precipitating the resulting salt by standard procedures, for example, concentration or dilution with a non-solvent. Of course, for therapeutic application only salts formed with pharmaceutically acceptable bases should be employed. Those formed with pharmaceutically unacceptable bases, of course, are not to be used in therapy but may be used as intermediates for the preparation of substantially pure pharmaceutically acceptable salts by standard procedures. The term, pharmaceutically acceptable bases, as herein employed, refers to those bases which on formation of a salt with a therapeutic agent of this invention do not substantially increase the toxicity of the agent. Pharmaceutically accepted salts are well known to those skilled in the art, for example, sodium, calcium magnesium, aluminum, zinc, ammonium and some times potassium salts as well as salts formed with organic amines such as piperidine, morpholine and the like.

1,2-diarylpyrazolidine-3,5-diones are known compounds which may be prepared by procedures well known in the art e.g. Helv. Chim. Acta., vol. 40, 395–401 (1957). For example, by reacting a malonic acid ester or a malonic acid chloride with a diarylhydrazine as described above. The alkali metal salt of 1,2-diarylpyrazolidine-3,5-dione may be prepared by treatment of this compound with an equivalent amount of an alkali metal hydroxide, carbonate, or bicarbonate in aqueous solution. The alkali metal salt may be recovered by evaporation of the solution, or alternatively, the aqueous solution of alkali metal salt may be used to prepare the present new compounds.

The compounds of the present invention are conveniently administered in composition form. Such compositions include a pharmaceutical carrier selected on the basis of the chosen route of administration and standard pharmaceutical practice. For example, they may be administered orally in the form of tablets containing such excipients as starch, milk sugar, certain types of clay, etc. They may be administered in capsules, in admixtures with the same or equivalent excipients. They may also be administered orally in the form of oral suspensions which may contain flavoring and coloring agents. They may be injected parenterally, i.e. for example, intramuscularly or subcutaneously. For oral administration of the therapeutic agents of this invention, tablets or capsules containing from about 25 to about 200 mg. are suitable for most applications.

3

The physician will determine the dosage which will be most suitable for an individual patient and it will vary with the form of administration, the age, weight and response of the particular patient. Generally, however, the initial dosage in adults may range from 300 to 600 mg. per day divided into 3 or 4 equal doses. In many instances, it is not necessary to exceed 400 mg. daily. After the initial dosage, the maintenance dosage may often be achieved with as little as 100 to 300 mg. daily.

The following examples are given by way of illustration and are not to be construed as limitations of this invention many variations of which are possible within the scope and spirit thereof.

EXAMPLE I

Five grams of 1,2-diphenylpyrazolidine-3,5-dione is suspended in 25 milliliters of water. Ten percent aqueous sodium hydroxide is added dropwise to dissolve the solids. Dilute hydrochloric acid is then added dropwise to this solution until the beginning of turbity (pH 6–7). This solution is then diluted with 50 milliliters of ethanol and 6 grams of 4-phenylphenacyl bromide is added. The mixture is refluxed for 1 hour and then cooled. The crystalline product, 1,2-diphenyl-4-(phenylbenzoylmethyl)pyrazolidine-3,5-dione obtained by filtration is recrystallized from ethanol, melting point 188–189° C.

Elemental analysis gave the following results: Calc. for: $C_{29}H_{22}N_2O_3$: C, 78.01; H, 4.91; N, 6.21. Found: C, 77.78; H, 4.86; N, 6.21.

EXAMPLE II

*1-(4-acetoxyphenyl)-2-phenyl-4-(4-phenylbenzoylmethyl)pyrazolidine-3,5-dione*

This product is obtained by the procedure of Example I using 1-(4-acetoxyphenyl)-2 - phenylpyrazolidine - 3,5-dione as starting compound.

EXAMPLE III

*1-(4-hydroxyphenyl)-2-phenyl-4-(4-phenylbenzoylmethyl)pyrazolidine-3,5-dione*

This compound is obtained from the product of Example II by warming in excess 2 N aqueous sodium hydroxide for one hour followed by acidification of the resultant solution with concentrated hydrochloric acid.

EXAMPLE IV

*1,2-di(3-hydroxyphenyl)-4-(4-phenylbenzoylmethyl)pyrazolidine-3,5-dione*

This compound is prepared by hydrogenation of 1,2-di(3-benzyloxyphenyl)- 4 -(4-phenylbenzolymethyl)pyrazolidine-3,5-dione in alcoholic sodium hydroxide at atmospheric pressure and room temperature over Raney nickel. After removal of the catalyst by filtration, the product is obtained by acidification of the reaction mixture followed by collection of the resulting precipitate.

EXAMPLE V

*1,2-di(3-benzyloxyphenyl)-4-(4-phenylbenzoylmethyl)pyrazolidine-3,5-dione*

This product is obtained by the procedure of Example I employing 1,2-di(3-benzyloxyphenyl)pyrazolidine - 3,5-dione as starting compound.

EXAMPLE VI

The following compounds may be prepared by the procedure of the above examples employing suitably substituted 4-phenylphenacyl halides and 1,2-diarylpyrazolidine-3,5-diones:

General formula

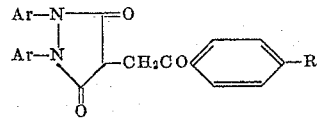

| Ar | R |
|---|---|
| $C_6H_5$ | $BrC_6H_4$ |
| $ClC_6H_4$ | $IC_6H_4$ |
| $CH_3OC_6H_4$ | $CH_3C_6H_4$ |
| $CH_3C_6H_4$ | $C_3H_7OC_6H_4$ |
| $C_3H_7C_6H_4$ | $CH_3OC_6H_4$ |
| $C_3H_7OC_6H_4$ | $isoC_3H_7C_6H_4$ |
| $C_6H_5$ | $CH_3COOC_6H_4$ |
| $ClC_6H_4$ | $HOC_6H_4$ |
| $C_2H_5COOC_6H_4$ | $ClC_6H_4$ |
| $C_6H_5$ | $(HO)_2C_6H_3$ |

EXAMPLE VII 1,2-diphenyl - 4-(4-phenylbenzoylmethyl)pyrazolidine-3,5-dione is dissolved in an aqueous solution of an equivalent amount of sodium hydroxide with gentle warming, if necessary. The solution, on concentration, yields the crystalline sodium salts of the above compound.

The alkali metal salts of the above described 1,2-diaryl-4-acylmethylpyrazolidine-3,5-diones are prepared employing this procedure with inorganic bases such as lithium hydroxide potassium carbonate, and the like. Other metal salts are similarly prepared.

EXAMPLE VIII 1,2-diphenyl-4 - (4-phenylbenzoylmethyl)pyrazolidine-3,5-dione is dissolved in ethanol. An equivalent amount of morpholine is then added and the resultant solution diluted with ether to obtain the amine salt of the above compound.

Other amine salts of the above described 1,2-diaryl-4-acylmethylpyrazolidine-3,5-diones may be prepared employing this procedure.

EXAMPLE IX

A tablet base was prepared by blending the following ingredients in the proportion by weight indicated:

| | |
|---|---|
| Sucrose U.S.P. | 80.3 |
| Tapioca starch | 13.2 |
| Magnesium stearate | 6.5 |

Into this base there was blended sufficient 1,2-diphenyl-4-(4 - phenylbenzoylmethyl)pyrazolidine-3,5-dione to provide tablets each containing 100 mg. of active ingredient.

EXAMPLE X

Into the tablet base of Example IX there was blended a sufficient amount of 1,2-diphenyl-4-(4 - phenylbenzoylmethyl)pyrazolidine-3,5-dione to provide tablets each containing 200 mg. of active ingredient.

EXAMPLE XI

A blend was prepared containing the following ingredients:

| | Grams |
|---|---|
| Calcium carbonate, U.S.P. | 17.6 |
| Dicalcium phosphate | 18.8 |
| Magnesium trisilicate, U.S.P. | 5.2 |
| Lactose, U.S.P. | 5.2 |
| Potato starch | 5.2 |
| Magnesium stearate A | 0.8 |
| Magnesium stearate B | 0.32 |
| 1,2 - diphenyl-4 - (4-phenylbenzoylmethyl)pyrazolidine - 3,5-dione | 20.0 |

This blend was divided and formed into capsules each containing 25 mg. of active ingredient.

This application is a continuation-in-part of our application, Serial No. 733,276, filed May 6, 1958, and now abandoned.

What is claimed is:
1. 1,2 - diphenyl-4-(4-phenylbenzoylmethyl)pyrazolidine-3,5-dione.
2. 1-(4-hydroxyphenyl)-2-phenyl-4 - (4-phenylbenzoylmethyl)pyrazolidine-3,5-dione.
3. 1,2-di(3 - hydroxyphenyl) - 4-(4 - phenylbenzoylmethyl)pyrazolidine-3,5-dione.
4. 1 - (4-acetoxyphenyl)-2-phenyl-4-(4-phenylbenzoylmethyl)pyrazolidine-3,5-dione.
5. 1,2 - di(3-benzyloxyphenyl) - 4-(4 - phenylbenzoylmethyl)pyrazolidine-3,5-dione.
6. A compound selected from the group consisting of compounds of the formula

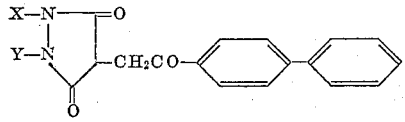

in which X is a member selected from the group consisting of phenyl, hydroxphenyl, acetoxyphenyl, and benzyloxyphenyl; and Y is selected from the group consisting of phenyl, hydroxphenyl, and benzyloxphenyl; and alkali metal salts thereof.

References Cited in the file of this patent
UNITED STATES PATENTS
2,873,278    Logemann et al. _____ Feb. 10, 1959

FOREIGN PATENTS
778,128    Great Britain _____ July 3, 1957
781,439    Great Britain _____ Aug. 21, 1957